United States Patent Office 2,955,112
Patented Oct. 4, 1960

2,955,112
AZETIDINES

Ernst Jucker, Binningen/Bld., Anton Ebnöther, Erwin Rissi, and Arnold Vogel, Basel, and Roy Steiner, Pfeffingen/Bld., Switzerland, assignors to Sandoz Ltd., Basel, Switzerland, a Swiss firm No Drawing. Filed June 2, 1958, Ser. No. 738,922
Claims priority, application Switzerland June 12, 1957
11 Claims. (Cl. 260—294)

The present invention relates to new azetidines. More especially, the invention is concerned with azetidines of the formula

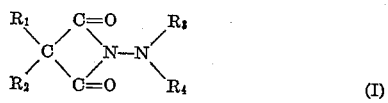
(I)

wherein $R_1$ and $R_2$ represent the same or different lower alkyl or aralkyl groups, $R_3$ may be hydrogen or an acyl group, and $R_4$ is a piperidyl-4 residue. $R_3$ and $R_4$ together may also form a 1-alkyl-piperidylidene-4 group.

Otherwise stated, Compounds I are 2,4-dioxo-azetidine derivatives which are characterized in that they are substituted in the 1-position by an N-alkyl-piperidyl-4-amino group, wherein the amino group may be acylated. In the three-position, the new azetidines carry two aliphatic, aromatic or araliphatic substituents.

The new Compounds I of the present invention are advantageously prepared as follows:

A mono- or di-substituted hydrazine derivative, e.g. (N-methyl-piperidyl-4)-hydrazine, dissolved in an organic solvent such as tetrahydrofurane, methylene chloride, chloroform, benzene, etc., is added dropwise, at room temperature or while cooling, to a solution of a reactive malonic acid derivative, such as diphenylmalonyl-dichloride, after which an aqueous alkali metal hydroxide solution or a tertiary base, such as triethylamine, is added to the mixture to bind liberated HCl, and then the reaction mixture allowed to stand at room temperature or at elevated temperature so that the reaction may go to completion.

A tertiary organic base, such as pyridine, may also be employed as solvent, in which event it is not necessary to add an extraneous HCl-binding agent.

The end products, according to the invention, are at room temperature solid crystalline compounds. They can be isolated from the reaction mixture in a variety of ways, e.g. by evaporating the reaction mixture and purifying the residue of the evaporation chromatographically or by recrystallization. The new compounds can be distilled under reduced pressure without decomposition, and can therefore also be purified by fractionation under reduced pressure. If an acylated hydrazine derivative is employed as starting material, the product according to the invention is a 1-acylamino-azetidine derivative; however, if the object is to produce an acyl-free product, then the acyl group can be split off, e.g. by heating with mineral acid.

The new azetidines can also be prepared as follows:
A compound of the formula

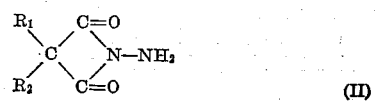
(II)

is condensed with a 1-alkyl-4-piperidone to form a hydrazone of the formula

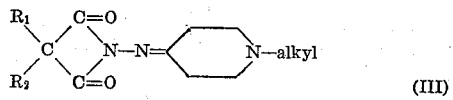
(III)

which is then reduced and, if desired, the secondary amine group may be acylated.

To prepare azetidine derivatives (II) with a free amino group in 1-position, an alkylidene-hydrazine, e.g. isopropylidene-hydrazine (acetone-hydrazone), is advantageously condensed with a reactive malonic acid derivative, e.g. diethylmalonyl-dichloride, and the alkylidene group then split off from the condensation product in per se known manner. The so-obtained 1-amino-2,4-dioxo-azetidines can be further converted, for example by reaction with an N-alkyl-4-piperidone in ethanol or an inert organic solvent such for example as chloroform, methylene chloride, tetrahydrofurane or benzene, and the resultant hydrazone reduced to the desired hydrazine by means of catalytically activated hydrogen. If it is desired to prepare an acylated product in this way, the acyl group can be introduced in per se known manner.

The azetidine-2,4-diones of the present invention represent a new class of compounds which, due to their excellent pharmacodynamic properties and their very low toxicity, are highly suitable for therapeutic use. The new compounds are suitable for the treatment of chronic rheumatism, chronic rheumatic polyarthritis, and various other arthritic processes. In animal tests, they frequently exhibit a strong antiphlogistic (inflammation-reducing) action. Following subcutaneous formalin injection in the rat, they inhibit edema production. They also have a strong analgetic action which makes them useful as analgetica. The compounds are distinguished by good local tolerability and very low toxicity.

The structural formula of the new compounds shows that the molecule thereof contains reactive groups. As a result, they are convertible chemically into other products which are likewise pharmacologically active and are therefore also useful therapeutically. The compounds of the invention are thus useful intermediates.

Compounds in which a basic substituent, such as for example an N-alkyl-piperidyl group, is attached to the amino group in the 1-position, can form physiologically acceptable stable salts with a wide variety of acids, organic as well as inorganic, and these salts have the same utilities as the corresponding bases. Illustrative of the salts—in addition to those mentioned as representatives in the examples which follow—are e.g. the phosphates, acetates, benzoates, citrates, malates, ethanesulfonates, methanesulfonates as well as many others.

In the following examples which set forth presently-preferred illustrative embodiments of the invention, but which are not at all intended to circumscribe the invention, the parts are by weight unless otherwise stated. In these examples, the relationship between parts by weight and parts by volume is the same as that between grams and milliliters. Percentages are also by weight. The temperatures are set forth in degrees centigrade. Melting points and boiling points are uncorrected.

Example 1

First a solution of 20.91 parts of (1-methylpiperidyl-4)-hydrazine in 80 parts by volume of tetrahydrofurane and then 45 parts by volume of triethylamine are stirred dropwise, while cooling with ice, into a solution of 47.5 parts of diphenylmalonyl-dichloride. The mixture is then heated to boiling for 4 hours, with continued stirring. After cooling, the mixture is diluted with ether, extracted with 2-normal hydrochloric acid, the acid aqueous extract rendered alkaline with concentrated aqueous caustic soda solution while cooling with ice, and then extracted with chloroform. The chloroform extract is dried over sodium sulfate and evaporated under reduced pressure. The crystalline residue from the evaporation is recrystallized once from ethanol. There is obtained the desired 1-(1'-methyl-piperidyl-4')-amino-3,3-diphenyl-2,4-dioxoazetidine in the form of dense needles which melt at 173–174°. The corresponding hydrochloride, recrystallized from ethanol-ether, melts at 228–232°.

Example 2

A solution of 6.45 parts of (1-methyl-piperidyl-4)-hydrazine and 14.0 parts by volume of triethylamine in 70 parts by volume of methylene chloride is slowly stirred dropwise, and while cooling with ice, into a solution of 9.85 parts of diethylmalonyl-dichloride in 200 parts by volume of methylene chloride. Upon completion of the addition, the mixture is stirred for two more hours at room temperature, then shaken with ice-cold aqueous caustic soda solution (20% strength) which is saturated with sodium chloride, then dried with the aid of sodium sulfate, and finally evaporated under reduced pressure. The residue from the evaporation is extracted with ether at room temperature, undissolved matter filtered off, and the filtrate evaporated under reduced pressure. The residue is extracted with boiling petroleum ether, the extract filtered through a glass suction filter to yield a clear filtrate which is then concentrated down to a small volume, whereupon the desired 1-(1'-methyl-piperidyl - 4') - amino - 3,3 - diethyl - 2,4- - dioxo-azetidine crystallizes out in the form of thin coalesced needles. Upon repeated crystallization from petroleum ether, the compound melts at 94–95°. Its hydrochloride melts at 227–229°.

Example 3

A solution of 3.42 parts of ω-acetyl-ω-(1-methyl-piperidyl-4)-hydrazine and 5.6 parts by volume of triethylamine in 80 parts by volume of chloroform is slowly stirred dropwise, and while cooling with ice, into a solution of 5.86 parts of diphenylmalonyl-dichloride in 160 parts by volume of chloroform. The mixture is thereupon stirred for another hour at room temperature, after which it is shaken with ice-cold aqueous caustic soda solution of 20% strength, dried over sodium sulfate, and then evaporated under reduced pressure. The residue thus obtained is dissolved in ice-cold 2-normal hydrochloric acid, the solution washed with ether, then rendered alkaline with ice-cold concentrated aqueous caustic soda solution while cooling with ice, and then extracted with chloroform. The obtained chloroform extract is dried over sodium sulfate and then evaporated under reduced pressure. The resultant crystalline crude product is recrystallized from ether-methylene chloride-petroleum ether, thus yielding the desired pure 1-(1'-methyl-piperidyl - 4') - acetylamino - 3,3 - diphenyl - 2,4 - dioxo-azetidine; melting point 175°.

Example 4

A solution of 8.55 parts of ω-acetyl-ω-(1-methyl-piperidyl-4)-hydrazine and 14.0 parts by volume of triethylamine in 100 parts by volume of methylene chloride are slowly stirred dropwise, and while cooling with ice, into a solution of 9.85 parts of diethylmalonyl-dichloride in 250 parts by volume of methylene chloride. The mixture is thereupon further stirred for three hours at room temperature, then shaken out with ice-cold aqueous caustic soda solution (20% strength) which is saturated with sodium chloride, dried over sodium sulfate and evaporated under reduced pressure. The so-obtained crude product is dissolved in a small quantity of methanol, methanolic hydrochloric acid added to the resultant solution until the latter has an acid reaction, after which the solution is evaporated to dryness under reduced pressure. The obtained hydrochloride of 1-(1'-methyl-piperidyl - 4') - acetylamino - 3,3 - diethyl - 2,4 - dioxo-azetidine is recrystallized from acetone-ether and then melts at 228–231°. The free base can be recovered from the hydrochloride in per se conventional manner, and crystallized from ether-petroleum ether in the form of prisms.

Example 5

0.5 part of 1-(1'-methyl-piperidyl-4')-acetylamino-3,3-diphenyl-2,4-dioxo-azetidine is heated to 100° under reflux for one hour with 25 parts by volume of 2-normal hydrochloric acid. The solution is then cooled to 0°, then rendered alkaline with concentrated aqueous caustic soda solution at 0 to 5°, and extracted with chloroform. The extract is dried and evaporated to dryness. The residue crystallizes in the form of needles upon being wetted with ether. The crystals melt at 173–174° and give a strong melting point depression with starting material, but no depression with the compound prepared according to Example 1. Like the latter, the product of the present example is the 1-(1'-methyl-piperidyl-4')-amino-3,3-diphenyl-2,4-dioxo-azetidine.

Example 6

2.4 parts of 1-(1'-methyl-piperidyl-4')-acetylamino-3,3-diethyl-2,4-dioxo-azetidine are heated on the water-bath for one hour with 20 parts by volume of 0.385-normal hydrochloric acid, after which the solution is evaporated under reduced pressure. The residue is shaken with ice-cold aqueous caustic soda solution (20%) which is saturated with sodium chloride, after which the chloroform solution is dried over sodium sulfate and then evaporated under reduced pressure. After two recrystallizations from petroleum ether, the acetyl-free compound [1-(1'-methyl - piperidyl - 4') - amino - 3,3 - diethyl - 2,4 - dioxo-azetidine] is obtained in the form of crystals which melt at 92–93°. This product shows no melting point depression in admixture with the product obtained according to Example 2.

Example 7

A solution of 4.0 parts of ω-carbophenoxy-ω-(1-methyl-piperidyl-4)-hydrazine and 4.5 parts by volume of triethylamine in 50 parts by volume of methylene chloride are slowly stirred dropwise, and while cooling with ice, into a solution of 3.16 parts of diethylmalonyl-dichloride in 100 parts by volume of methylene chloride. The mixture is then further stirred for two hours at room temperature, then shaken out with ice-cold aqueous caustic soda solution (20% strength) which is saturated with sodium chloride, dried over sodium sulfate, and evaporated under reduced pressure. The so-obtained residue is recrystallized from petroleum ether. The obtained crystalline 1-(1'-methyl-piperidyl-4')-carbophenoxyamino-3,3-diethyl-2,4-dioxo-azetidine melts at 88–90°. The hydrochloride of this base, after recrystallization from acetone-ether, melts at 243–245°.

Example 8

A solution of 4.66 parts of ω-benzoyl-ω-(1-methyl-piperidyl-4)-hydrazine and 5.6 parts by volume of triethylamine in 100 parts by volume of methylene chloride is slowly stirred dropwise, while cooling with ice, into a solution of 3.94 parts of diethylmalonyl-dichloride in 100 parts by volume of methylene chloride. The mixture is thereupon further stirred for 1½ hours at room temperature, after which it is shaken out with ice-cold aqueous caustic soda solution (20% strength) which is saturated with sodium chloride, dried over sodium sulfate, and evaporated to dryness under reduced pressure. The thus-prepared 1-(1'-methyl-piperidyl-4')-benzoyl-amino-3,3-diethyl-2,4-dioxo-azetidine melts at 93–94°.

The hydrochloride of this base, after recrystallization from acetone-ether, melts at 215–216°.

Example 9

A solution of 3.03 parts of ω-acetyl-ω-(1-methyl-piperidyl-4)-hydrazine and 4.97 parts by volume of triethylamine in 60 parts by volume of methylene chloride is stirred dropwise and while cooling with ice, into a solution of 5.7 parts of dibenzylmalonyl-dichloride in 150 parts by volume of methylene chloride. Stirring of the mixture is then continued for 2 hours at room temperature, after which it is shaken out with ice-cold aqueous caustic soda solution (20% strength) which is saturated with sodium chloride, then dried over sodium sulfate, and the methylene chloride evaporated off under reduced pressure. The thus-prepared oily residue—1-(1'-methyl-piperidyl - 4') - acetylamino - 3,3 - dibenzyl - 2,4 - dioxo-azetidine—is converted into the hydrochloride by the action of methanolic HCl. After recrystallization from ethylene-ether, the hydrochloride melts at 238–241°.

Example 10

A solution of 3.42 parts of ω-acetyl-ω-(1-methyl-piperidyl-4)-hydrazine and 5.66 parts by volume of triethylamine in 100 parts by volume of methylene chloride is added dropwise to a solution of 4.5 parts of di-n-propyl-malonyl-dichloride in 150 parts by volume of methylene chloride, after which stirring is continued for three hours at room temperature. After working up as in the preceding example, the desired 1-(1'-methyl-piperidyl-4')-acetylamino-3,3-di-n-propyl-2,4-dioxo-azetidine is obtained; recrystallized from petroleum ether, this base melts at 86–87°. The hydrobromide of the base, after recrystallization from ethanol-ether, melts at 187–188°.

Example 11

A solution of 3.7 parts of ω-propionyl-ω-(1-methyl-piperidyl-4)-hydrazine and 5.6 parts by volume of triethylamine in 100 parts by volume of methylene chloride is stirred dropwise and while cooling with the ice into a solution of 3.94 parts of diethylmalonyl-dichloride, after which stirring is continued for three hours at room temperature. Working up of the mixture is as in the preceding examples, yielding 1-(1'-methyl-piperidyl-4')-propionylamino - 3,3 - dimethyl-2,4-dioxoazetidine which, recrystallized from petroleum ether, melts at 67–68°.

Example 12

A solution of 3.98 parts of ω-n-butyryl-ω-(1-methyl-piperidyl-4)-hydrazine and 5.6 parts by volume of triethylamine in 75 parts by volume of methylene chloride are stirred dropwise and while cooling with ice into a solution of 3.94 parts of diethylmalonyl-dichloride in 150 parts by volume of methylene chloride, after which stirring is continued for 3 hours at room temperature. Further working up after the manner described in the preceding examples yields 1-(1'-methyl-piperidyl-4')-n-butyrylamino-3,3-diethyl-2,4-dioxo-azetidine which, after recrystallization from petroleum ether, melts at 72–73°. The hydrochloride of the so-prepared base has a melting point of 198°, following recrystallization from acetone-ether and from benzene.

Example 13

A solution of 10.53 parts of ω-acetyl-ω-(1-methyl-piperidyl-4)-hydrazine and 17.2 parts by volume of triethylamine in 100 parts by volume of methylene chloride are stirred dropwise and while cooling with ice into a solution of 15.55 parts of di-n-butyl-malonyl-dichloride in 300 parts by volume of methylene chloride. The mixture is thereupon further stirred for three hours at room temperature, then shaken out with ice-cold aqueous caustic soda solution (20% strength), which is saturated with sodium chloride, and then the methylene chloride solution dried over sodium sulfate and evaporated to dryness under reduced pressure. After one crystallization from ether-petroleum ether, the so-obtained 1-(1'-methylpiperidyl - 4') - acetylamino - 3,3-di-n-butyl-2,4-dioxo-azetidine melts at 102–103°.

To convert the thus-prepared base into the hydrochloride thereof, the base is dissolved in methanol, after which hydrogen chloride is passed into the solution while cooling with ice, and the solution then evaporated to dryness under reduced pressure. After four-fold recrystallization from benzene-petroleum ether, the hydrochloride melts at 183–185° (in the form of needles).

Example 14

A solution of 5.0 parts of ω-acetyl-ω-(1-methylpiperidyl-4)-hydrazine and 8.2 parts by volume of triethylamine in 5.5 parts by volume of methylene chloride are stirred dropwise and while cooling with ice into a solution of 6.75 parts of phenyl-methyl-malonyl-dichloride in 36 parts by volume of methylene chloride. The mixture is then stirred for 3 more hours at room temperature, then shaken out with ice-cold aqueous caustic soda solution (20% strength) which is NaCl-saturated, and then the methylene chloride solution dried over magnesium sulfate, filtered through fuller's earth and evaporated to dryness under reduced pressure. The crystalline residue, 1 - (1' - methyl - piperidyl - 4') - acetylamino - 3 -methyl-3-phenyl-2,4-dioxo-azetidine.

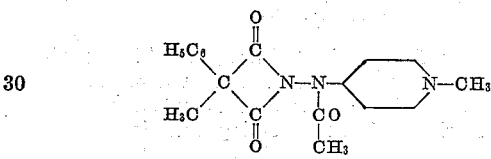

is recrystallized from methylene chloride-petroleum ether or from hexane, whereupon it melts at 128.6–129.2°.

Example 15

A solution of 1.81 parts of ω-benzylsalicoyl-ω-(1-methyl-piperidyl-4)-hydrazine and 1.5 parts by volume of triethylamine in 40 parts by volume of methylene chloride is stirred dropwise and while cooling with ice into a solution of 1.05 parts of diethyl-malonyl-dichloride in 50 parts by volume of methylene chloride. Stirring is then continued for two more hours at room temperature. Further working up as in the preceding Example yields the desired 1-(1'-methyl-piperidyl-4')-benzylsalicoylamino-3,3-diethyl-2,4-dioxo-azetidine, which — after recrystallization from ether-petroleum ether—is in the form of polyhedrons, melting at 127–128°.

Example 16

A solution of 8.52 parts of ω-pivaloyl-ω-(1-methyl-piperidyl-4)-hydrazine and 11.2 parts by volume of triethylamine in 100 parts by volume of methylene chloride is stirred dropwise and while cooling with ice into a solution of 7.88 parts of diethymalonyl-dichloride in 250 parts by volume of methylene chloride. Stirring of the solution is then continued for 3 hours at room temperature, after which the solution is shaken out with ice-cold NaCl-saturated aqueous caustic soda solution of 20% strength, and the methylene chloride solution then dried over sodium sulfate and evaporated to dryness under reduced pressure. The crude product is recrystallized from petroleum ether, whereupon the pure product, 1-(1'-methyl-piperidyl-4')-pivaloylamino-3,3-diethyl-2,4-dioxo - azetidine

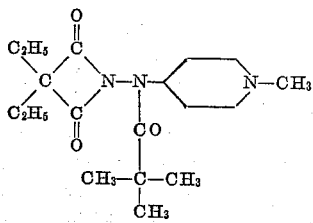

is obtained in the form of plates which melt at 87–88°.

The hydrochloride of the so-obtained base crystallizes in the form of platelets and, after being recrystallized from ethanol-ether, melts at 251–252°.

*Example 17*

2.01 parts of N-methyl-4-piperidone are added to a solution of 4.48 parts of 1-amino-3,3-diphenyl-2,4-dioxo-azetidine in 50 parts by volume of chloroform, after which the mixture is heated to boiling under reflux for one hour. The solution is then evaporated to dryness under reduced pressure. The residue is recrystallized several times from ether-petroleum ether, the hydrazone being obtained in the form of large prisms which melt at 135–136°.

0.56 part of the thus-obtained hydrazone is dissolved in 100 parts by volume of ethanol with slight warming, 0.1 part of platinum oxide is added to the resultant solution which is then shaken in a hydrogen atmosphere at room temperature and under normal pressure. The calculated quantity of hydrogen is taken up after six hours. After filtration, the filtrate is evaporated to dryness under reduced pressure, and the crystalline residue twice recrystallized from ethanol. The so-obtained 1-(1'-methyl-piperidyl-4')-amino-3,3-diphenyl-2,4-dioxo-azetidine melts at 172–173° and forms a hydrochloride which, following recrystallization from ethanol-ether, melts at 228–232°.

*Example 18*

A solution of 5.0 parts of 1-acetyl-1-(1'-isopropyl-piperidyl-4')-hydrazine and 7.1 parts by volume of triethylamine in 100 parts by volume of methylene chloride is stirred dropwise and while cooling with ice into a solution of 4.94 parts of diethylmalonyl-dichloride in 200 parts by volume of methylene chloride, after which the mixture is stirred for two more hours at room temperature. The solution is then shaken out with aqueous caustic soda solution (20% strength) which is satuated with NaCl and has been cooled to −15°, after which the methylene chloride solution is dried over sodium sulfate and is evaporated under reduced pressure. The so-obtained oily residue crystallizes upon being cooled with chloroform-Dry Ice (carbon dioxide snow); it is the desired 1 - (1' - isopropyl-piperidyl-4')-acetylamino-3,3-diethyl-2,4-dioxo-azetidine.

The latter is converted to its hydrochloride by introducing dry hydrogen chloride in a methanolic solution of the base, while cooling with ice. The hydrochloride is recrystallized from methanol-ether and from acetone-methanol-ether; it forms prisms which melt at 218–220° (with decomposition).

*Example 19*

A solution of 6.96 parts of 1-acetyl-1-(1'-ethyl-piperidyl-4')-hydrazine and 10.5 parts by volume of triethylamine in 100 parts by volume of methylene chloride is stirred dropwise and while cooling with ice into a solution of 7.4 parts of diethylmalonyl-dichloride in 200 parts by volume of methylene chloride, stirring of the mixture being continued for 2½ hours at room temperature. The mixture is worked up as in the preceding example, yielding 1-(1'-ethyl-piperidyl-4')-acetylamino-3,3-diethyl-2,4-dioxo-azetidine in the form of an oil which forms a hydrochloride which, following recrystallization from acetone-ether, is in the form of shiny plates which melt at 221–224° (with decomposition).

*Example 20*

A solution of 6.0 parts of 1-n-capronyl-1-(1'-methyl-piperidyl-4')-hydrazine and 7.4 parts by volume of triethylamine in 100 parts by volume of methylene chloride is stirred dropwise into a solution of 5.2 parts of diethyl-malonyl-dichloride in 200 parts by volume of methylene chloride, stirring being then continued for 2½ hours at room temperature. Working up as in the preceding example yields 1-(1'-methyl-piperidyl-4')-n-capronylamino-3,3-diethyl-2,4-dioxo-azetidine which, recrystallized from petroleum ether, forms long needles which melt at 95–96°. The corresponding hydrochloride, after being recrystallized from acetone-ether, yields small felted platelets which melt at 170° (with decomposition).

*Example 21*

A solution of 30.0 parts of 1-butyryl-1-(1-methyl-piperidyl-4')-hydrazine and 41.9 parts by volume of triethylamine in 81 parts by volume of trichloroethylene is added dropwise to a solution of 38.38 parts of di-n-butyl-malonyl-dichloride in 161 parts by volume of trichloroethylene in the course of 20 minutes and at a maximum temperature of 25°. Upon completion of the addition, cooling being discontinued, the temperature rises to 35°. After four hours, the mixture is cooled with ice; the so-precipitated triethylamine hydrochloride is filtered off, the latter washed with a total of 250 parts by volume of trichloroethylene, and the combined trichloroethylene solutions evaporated under a pressure of 15 mm. Hg. The residue is dissolved in 150 parts by volume of water, and the solution is shaken out with a total of 350 parts by volume of hexane, the hexane layer evaporated, and the so-obtained residue recrystallized from hexane-petroleum ether. The thus-obtained 1-(1'-methyl-piperidyl-4')-butyrylamino-3,3-di-n-butyl - 2,4-dioxo-azetidine has a melting point of 82.0–82.4°.

The hydrazine derivatives which contain an N-alkyl-piperidyl-4 group, used as starting materials in the foregoing examples, are known. The preparation of these hydrazine derivatives is described in Belgian Patent No. 553,994. According to the latter, such hydrazines are prepared by condensing an N-alkyl-4-piperidone, for example N-methyl-4-piperidone or N-ethyl-4-piperidone, with an acyl hydrazine, hydrogenating the so obtained N-alkyl-4-piperidone-acyl-hydrazone, and splitting off the acyl group.

The ω-(1-alkyl-piperidyl-4)-ω-acyl-hydrazines, which can also be named 1-acyl-1-(1'-alkyl-piperidyl-4')-hydrazines, are described in Belgian Patents Nos. 568,934 and 574,139. They are prepared by condensing the N-alkyl-piperidyl-4-hydrazines with acetone to ω-(1-alkyl-piperidyl-4)-ω'-isopropylidene-hydrazines, acylating these isopropylidene derivatives with acylchlorides, and splitting off the isopropylidene group by means of hydrogen chloride in ethanolic solution in the cold. Thus, from ω-(1-methyl - piperidyl-4)-ω' - isopropylidene - hydrazine (B.P. 68–70° under a pressure of 0.3 mm. Hg), from ω-(1-ethyl-piperidyl-4)-ω'-isopropylidene-hydrazine (crystalline substance), and from ω-(1-isopropyl-piperidyl-4)-ω'-isopropylidene-hydrazine (B.P. 70–105° under a pressure of 0.8 mm. Hg) respectively, the corresponding acyl derivatives are obtained. The melting points thereof are listed in the following table:

| Alkyl group in the 1-position of the piperidine nucleus | Acylating agent | Melting point of the final product, degrees |
| --- | --- | --- |
| methyl | acetyl chloride | 74–76. |
| Do | trimethylacetyl chloride (pivaloyl chloride). | 120–122. |
| Do | propionyl chloride | 94–96. |
| Do | n-butyric acid chloride | 66. |
| Do | n-capronic acid chloride | 84–85. |
| ethyl | acetyl chloride | 113–114. |
| isopropyl | do | 86–87. |
| methyl | benzoyl chloride | 146–148. |
| Do | benzyl salicoyl chloride | oily product. |
| Do | phenyl chlorocarbonate | 79–80. |

(NOTE.—The term "n-capronic acid chloride"—also sometimes termed "n-caproic acid chloride"—refers to normal—$CH_3(CH_2)_4COCl$. The terms "n-caproyl-" refers to the corresponding n-$C_5H_{11}CO$— group.)

Having thus disclosed the invention, what is claimed is:
1. 1-(1'-methyl - piperidyl-4')-amino-3,3-diphenyl-2,4-dioxo-azetidine.
2. 1-(1'-methyl - piperidyl-4')-acetylamino-3,3-diethyl-2,4-dioxo-azetidine.
3. 1-(1'-methyl - piperidyl - 4') - acetylamino - 3,3-dibenzyl-2,4-dioxo-azetidine.
4. 1-(1'-methyl - piperidyl - 4')-acetylamino - 3,3-di-n-propyl-2,4-dioxo-azetidine.
5. 1-(1'-methyl - piperidyl - 4')-acetylamino - 3,3-di-n-butyl-2,4-dioxo-azetidine.
6. 1-(1'-methyl - piperidyl - 4')-n-capronylamino - 3,3-diethyl-2,4-dioxo-azetidine.
7. 1-(1'-methyl - piperidyl-4')-butyrylamino - 3,3-di-n-butyl-2,4-dioxo-azetidine.
8. A compound of the formula

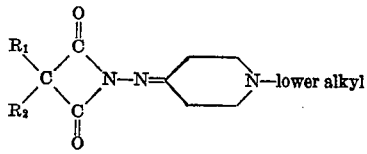

wherein each of $R_1$ and $R_2$ is phenyl.
9. A compound of the formula

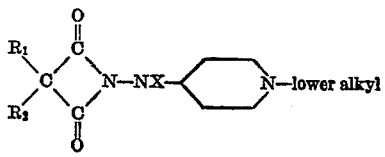

wherein each of $R_1$ and $R_2$ is lower alkyl, and X is a member selected from the group consisting of H, lower alkylcarbonyl and mononuclear carbocyclic arylcarbonyl.
10. A compound of the formula

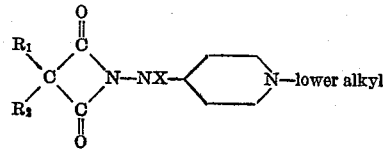

wherein each of $R_1$ and $R_2$ is phenyl, and X is a member selected from the group consisting of H, lower alkylcarbonyl and mononuclear carbocyclic arylcarbonyl.
11. 1-(1'-isopropyl - piperidyl-4')-acetylamino-3,3-diethyl-2,4-dioxo-azetidine.

References Cited in the file of this patent
King et al.: J. Chem. Soc., p. 1326 (1949).
King et al.: J. Chem. Soc., p. 3074 (1952).